United States Patent
Blair

[15] 3,658,181
[45] Apr. 25, 1972

[54] UNDERWATER OIL LEAKAGE COLLECTING APPARATUS

[72] Inventor: Thomas O. Blair, 8026 S.E. Powell Boulevard, Portland, Oreg. 97206

[22] Filed: May 22, 1970

[21] Appl. No.: 39,928

[52] U.S. Cl. .......................210/170, 210/DIG. 21, 210/242
[51] Int. Cl. ......................................E02b 15/00, C02b 9/02
[58] Field of Search ....................55/206, 193, 202; 210/489, 210/83, 242, 523, DIG. 21; 137/13; 114/.5

[56]         References Cited

UNITED STATES PATENTS

| | | | |
|---|---|---|---|
| 3,500,841 | 3/1970 | Logan | 137/13 |
| 1,836,338 | 12/1931 | Rodman et al. | 55/193 |
| 3,389,559 | 6/1968 | Logan | 210/242 X |
| 3,339,512 | 9/1967 | Siegel | 114/.5 |

FOREIGN PATENTS OR APPLICATIONS

| | | | |
|---|---|---|---|
| 787,348 | 12/1957 | Great Britain | 55/202 |

Primary Examiner—Reuben Friedman
Assistant Examiner—T. A. Granger
Attorney—Oliver D. Olson

[57]           ABSTRACT

A plurality of perforate cones are secured at longitudinally spaced intervals to an elongated cable. The lowermost cone is arranged over an underwater source of oil leakage and the upper end of the cable terminates at an oil collecting chamber adjacent the surface of the water. Leaking oil thus is reduced to small bubbles or streams by passage upward through the perforate cones which also direct the oil inward toward the cable, forming a column of oil which is collected at the collecting chamber.

10 Claims, 4 Drawing Figures

Patented April 25, 1972
3,658,181
2 Sheets-Sheet 1
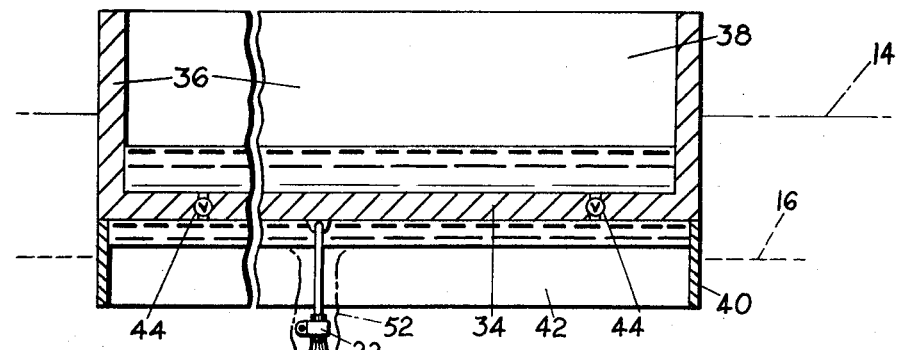
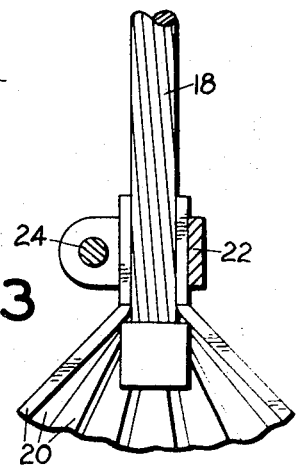
FIG. 3
FIG. 1
FIG. 2
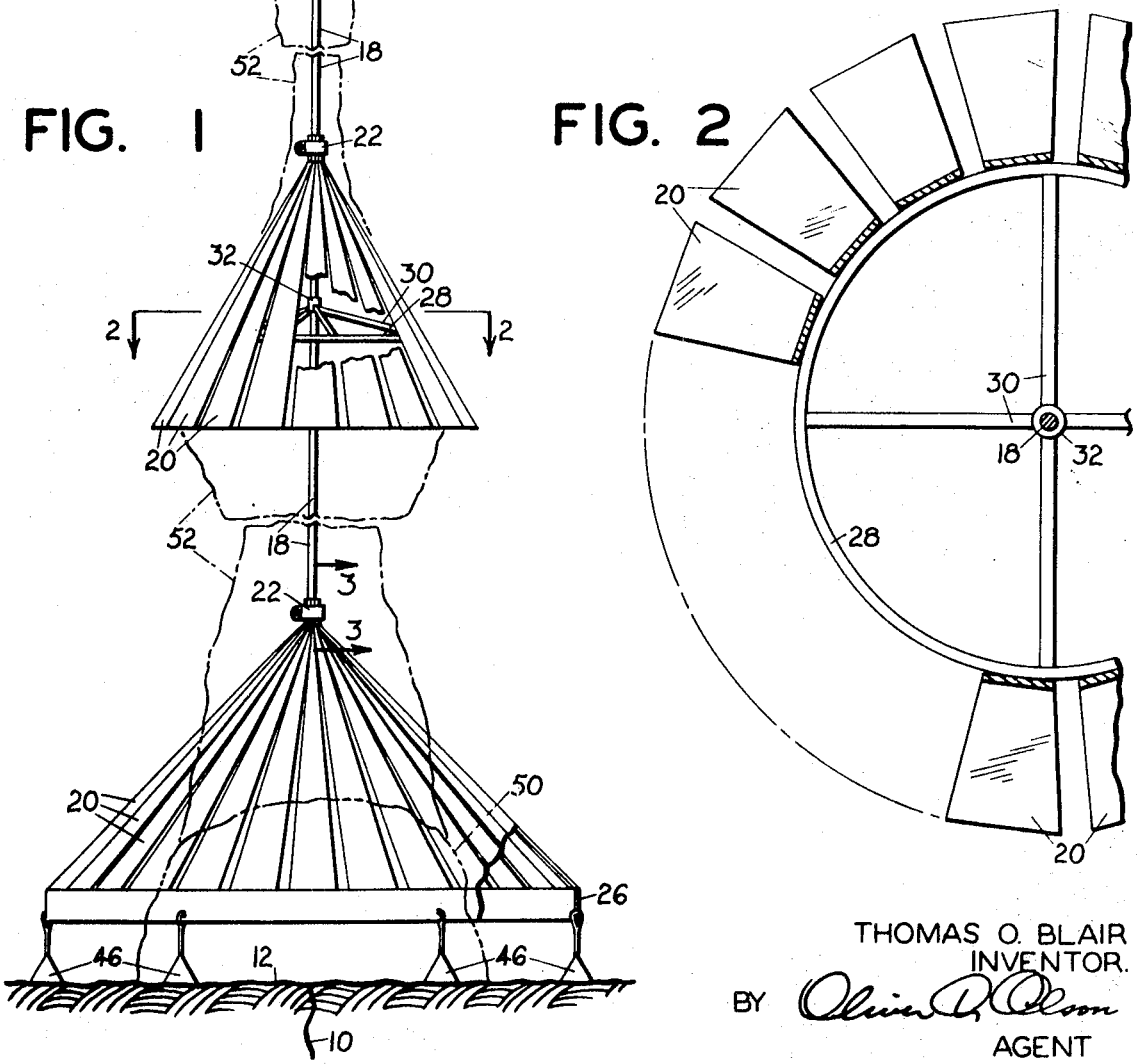
THOMAS O. BLAIR
INVENTOR.
BY Oliver D. Olson
AGENT

UNDERWATER OIL LEAKAGE COLLECTING APPARATUS

BACKGROUND OF THE INVENTION

This invention relates to the collection of underwater leakage oil, and more particularly to simplified apparatus for collecting oil leaking from an underwater break in an oil source.

The occurrence and catastrophic effects of underwater oil leakage, as from a fracture in the ocean floor in the area of an oil drilling operation, or from breakage of oil pipe lines associated with offshore drillings, are well known. Various attempts have been made heretofore to confine and collect such leakage oil, either at the underwater site of the leak or at the surface. For example, large containers of flexible plastic have been lowered into the ocean over an oil leak to trap the oil, whereupon the container is floated to the surface for collection. Log barriers have been formed on the ocean surface to confine floating oil within it. These and other attempts have proved to be impracticable in execution, cost and effectiveness.

SUMMARY OF THE INVENTION

In its basic concept the apparatus of this invention includes a plurality of perforate cones disposed at spaced intervals along an elongated core extending downward from a collecting chamber, the lowermost cone being adapted to overlie an underwater source of leakage whereby the assembly of cones and core functions to direct the oil upward in a column about the core for collection in the chamber adjacent the surface of the water.

It is by virtue of the foregoing basic concept that the principal objective of this invention is achieved; namely, to overcome the disadvantages associated with prior methods and means for collecting leakage oil, as previously mentioned.

The foregoing and other objects and advantages of this invention will appear from the following detailed description, taken in connection with the accompanying drawings of the preferred embodiments.

BRIEF DESCRIPTION OF THE DRAWINGS

FIG. 1 is a foreshortened view in vertical elevation of apparatus embodying the features of this invention, parts being broken away to disclose details of internal construction, the apparatus being illustrated in position for collecting oil leaking from a fracture in an ocean floor.

FIG. 2 is a fragmentary sectional view taken on the line 2—2 in FIG. 1.

FIG. 3 is a fragmentary sectional view taken on the line 3—3 in FIG. 1.

DESCRIPTION OF THE PREFERRED EMBODIMENTS

Figure 4:
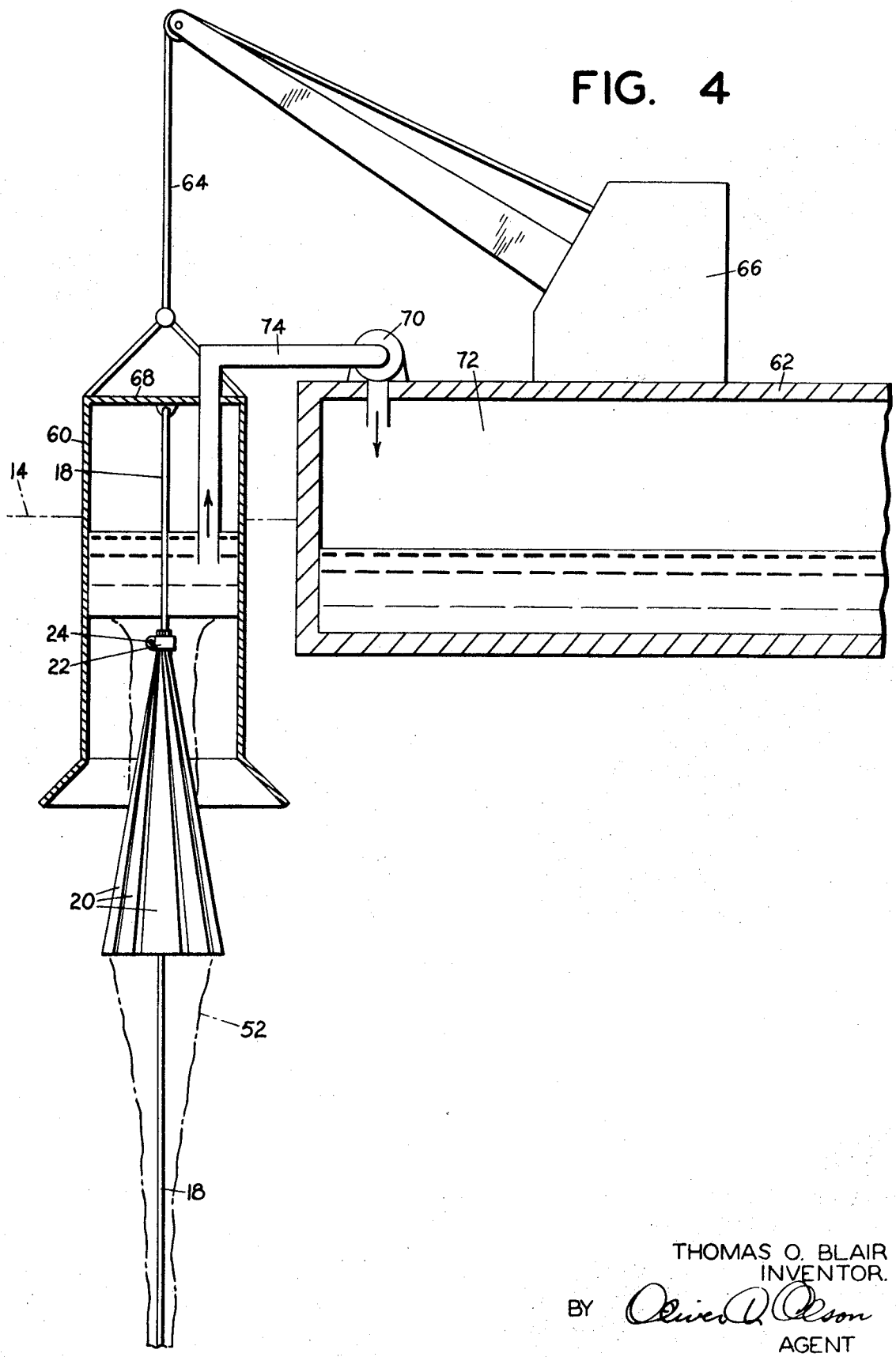
FIG. 4 is a fragmentary view in vertical elevation of a second form of oil collecting apparatus embodying the features of this invention.

For purposes of illustration the apparatus of this invention is shown in FIG. 1 in position to collect oil leaking from a fracture 10 in the ocean floor 12 a distance below the surface 14. The surface of the ocean is turbulent to a variable depth, indicated by the broken line 16, which depth is dependent upon weather conditions. Below that depth the ocean water is relatively quiescent.

The apparatus of this invention includes an elongated core member 18, illustrated in the drawings as an elongated flexible metal cable. Depending upon circumstances of use, the core member may be provided in the form of a rod, pipe or other suitable member. In any event the core member is adapted to extend downward in the water substantially to the depth of an oil leak. Thus, in the embodiment illustrated in FIG. 1 the cable is adapted to extend substantially to the ocean floor.

A plurality of perforate cone members are secured to the core member at longitudinally spaced intervals. In the embodiment illustrated in the drawings, each cone member is formed of a plurality of circumferentially spaced vanes 20 which are secured at their upper ends to the core member, as by means of the split clamp member 22 which functions, upon tightening of the clamping bolt 24, to draw the upper ends of the vanes securely to the core member. The vanes diverge downwardly from the core member to provide a cone which flares downward to its maximum peripheral dimension.

In this regard it is to be understood that the cone member may be circular in transverse dimension, as illustrated in FIG. 2, or it may be square, rectangular or any other desired configuration.

Means is provided for securing the vanes in spaced-apart relation to provide the cone with a perforate structure. In the lowermost cone illustrated in FIG. 1 this means is provided by the peripheral skirt 26 to which the bottom ends of the vanes are secured in spaced-apart relation.

In the cones above the lowermost cone in FIG. 1, such means is provided by the peripheral ring 28 located intermediate the ends of the vanes and to which the vanes are secured in spaced-apart relation. Radiating inward from the ring are a plurality of circumferentially spaced spokes 30 which are secured at their inner ends to a central hollow sleeve 32 slidably receiving the cable core member therethrough. The arrangement of spokes thus serves to maintain the cone centered about the core member.

The cone members may be made of wire rods, screening, expanded metal, perforate sheet metal, or other forms of material, as desired.

The upper end of the core member is surrounded by means for collecting the leakage oil. In the embodiment illustrated in FIG. 1 the oil collecting means is combined with oil storage means in the form of a barge having a bottom 34 and a peripheral wall 36 defining an oil storage chamber 38. A peripheral skirt 40 extends downward from the bottom 34 to define with the latter an oil collecting chamber 42. The skirt extends downward from the bottom of the barge a distance sufficient to extend below the turbulence level 16 of the ocean, so as to insure against the loss of collected oil in the chamber 42. The upper end of the core member is secured to the bottom wall of the barge substantially at the center of the latter.

Means is provided for transferring collected oil from the chamber 42 to the storage chamber 38. In the embodiment illustrated in FIG. 1 such means is provided by one or more shut-off valves 44 each in a passageway extending through the bottom 34 of the barge. The valves normally are maintained closed. However, when a desired quantity of oil has been collected in the chamber 42 the valves may be opened to allow the oil to transfer upward into the storage chamber 38 of the barge. When the barge has been filled with oil it may be replaced with an empty one, or the storage oil may be transferred to an oil tanker, by conventional pumping procedures.

The operation of the apparatus illustrated in FIG. 1 is as follows:

The barge is moved into position so that the lowermost cone member overlies the fracture in the ocean floor. A plurality of weights 46 may be attached to the lowermost cone member to assure maintenance of the position of the latter properly over the fracture.

As the oil leaks from the fracture it generally forms a large bubble 50, as illustrated. As the bubble progresses upward through the slits or other forms of perforations in the lowermost cone member, it is broken up into small bubbles or streams. Further, since the oil tends to progress upward and inward along the vanes toward the axis of the core member, the body of oil passing through the cone member is drawn inward, decreasing in diameter. This column 52 of oil thus progresses upward about the core member. Since the column of oil may tend to spread upward to increasing diameter, for example because of slight current flow of water in the quiescent depths of the ocean, the next adjacent cone member is provided with a maximum peripheral dimension sufficient to contain the expanded column of oil and to reconcentrate it to smaller diameter as the column passes through the perforate cone member. This procedure is repeated successively as the oil column progresses upward toward the surface of the ocean, whereupon the oil is trapped within the collecting chamber 42.

Since the column of oil decreases in diameter progressively upward, the cone members may be provided with maximum transverse peripheral dimensions which decrease progressively upward, as illustrated.

In the embodiment illustrated in FIG. 4 the collecting chamber is provided in the form of a container 60 supported for movement independently of the barge 62 by such means as the elongated cable 64 extending from the power operated boom 66 mounted on the barge.

In the position of use illustrated in FIG. 4 the container may be open at both its bottom and top ends, since the top end extends above the surface 14 of the ocean. However, in the preferred embodiment illustrated, the upper end of the container is closed by the top wall 68 to which the upper end of the core member is secured. Thus, the boom may be operated to lower the container into the ocean to any desired depth. This arrangement facilitates adjustment of the lowermost cone member over the source of oil leakage.

Means is provided for removing oil collected in the container 60 for storage. In the embodiment illustrated such means is provided by a fluid pump 70 mounted on the barge. The outlet of the pump discharges into the barge, which provides a storage chamber 72 for the oil. The inlet of the pump is connected through an elongated flexible hose 74 to the interior of the container, for removal of oil collected therein by the previously described operation of the core and cone assembly.

It will be appreciated from the foregoing that the present invention provides simplified and economical means by which to collect oil leaking from a variety of sources at a wide range of depths below the surface of water. The assembly of core and cone members accommodates the upward flow of a column of oil many times greater in diameter that the core member. Accordingly, the assembly may be relatively light in weight, easily portable and adjustable to various depths of leakage oil sources. The cone members may be of various maximum peripheral dimensions and shapes to accommodate a variety of types and sizes of oil breaks.

It will be apparent to those skilled in the art that various changes may be made in the structural details described hereinbefore. For example, the upper end of the core member in FIG. 1 may be secured to a winch on the barge for adjusting the position of the lowermost cone member relative to an oil leak, as in the embodiment illustrated in FIG. 4. Alternatively, the upper end of the core member may be buoyed independently of the barge for positioning freely within the oil collecting chamber and confined therein by the skirt. If an oil break occurs in an oil pipe line, the latter may constitute the core member. In such instance the cone members are positioned concentrically on the pipe line. A plurality of the assemblies described hereinbefore may be arranged over an area of a large oil leak, if one assembly is not sufficient. These and other changes may be made without departing from the spirit of this invention.

Having now described my invention and the manner in which it may be used, I claim:

1. Apparatus for collecting underwater leakage oil, comprising
   a. oil collecting means having a peripheral side wall and an open lower end constructed and arranged to be below the surface of a body of water,
   b. an elongated core member the upper end of which is surrounded by said open lower end, the core member being adapted to extend downwardly below the surface of said body of water substantially to the depth of an underwater oil leak, and
   c. a plurality of perforate cone members of varying diameters with open ends at their largest diameters, surrounding said core member, supported thereby and with said open ends facing the floor of said body of water with the cone member of largest diameter in a position adjacent and overlying the underwater oil leak, whereby oil leaking from the underwater leak may be collected by said first cone member and directed upwardly through said perforations therein to said other perforate cone members and to the open lower end of said collecting means located below the surface of said body of water.

2. The apparatus of claim 1 wherein the core member is a flexible cable.

3. The apparatus of claim 1 wherein the oil collecting means comprises a container having an open bottom end adapted to be submerged in the water below the turbulence level thereof.

4. The apparatus of claim 3 including oil removal means communicating with the container for removing oil therefrom.

5. The apparatus of claim 4 wherein the container is closed at its upper end and the oil removal means includes a fluid pump.

6. The apparatus of claim 4 wherein the container has a transverse wall intermediate its top and bottom ends separating the container into a bottom collecting chamber and a top storage chamber.

7. The apparatus of claim 6 wherein the oil removal means comprises valve means for selectively opening and closing communication between the oil collecting chamber and the oil storage chamber.

8. The apparatus of claim 1 wherein each cone member comprises a plurality of circumferentially spaced vanes secured at their upper ends to the core member and flaring downward relative thereto.

9. The apparatus of claim 8 wherein the plurality of cone members decrease in maximum transverse dimensions progressively upward from the lowermost cone member.

10. The apparatus of claim 8 including means interengaging the core member and the cone members above the lowermost cone member for maintaining said cone members substantially concentric with the core member.

* * * * *